(12) United States Patent
Schmidt

(10) Patent No.: US 6,185,828 B1
(45) Date of Patent: Feb. 13, 2001

(54) POSITION SIGNAL TRANSMITTER FOR A SERVO DRIVE

(75) Inventor: Michael Schmidt, Wildberg (DE)

(73) Assignee: Armatic Gesellschaft fuer automatische Armaturen mbH, Randersacker (DE)

( * ) Notice: Under 35 U.S.C. 154(b), the term of this patent shall be extended for 0 days.

(21) Appl. No.: 09/206,650

(22) Filed: Dec. 7, 1998

(30) Foreign Application Priority Data

Dec. 6, 1997 (DE) .............................................. 197 54 271

(51) Int. Cl.[7] .............................. G01D 3/08; G01D 5/04

(52) U.S. Cl. ........................................... 33/1 PT; 33/661

(58) Field of Search .................................. 33/1 PT, 613, 33/645, 655, 656, 661; 318/793

(56) References Cited

U.S. PATENT DOCUMENTS

| | | | |
|---|---|---|---|
| 2,940,171 | * 6/1960 | Steele | 33/1 PT |
| 2,944,157 | * 7/1960 | McAuslan et al. | 33/1 PT |
| 3,731,386 | * 5/1973 | Kreiensen et al. | 33/1 PT |
| 5,218,769 | * 6/1993 | Tranchon | 33/1 PT |
| 5,657,544 | * 8/1997 | Ota et al. | 33/1 PT |
| 5,930,905 | * 8/1999 | Zabler et al. | 33/1 PT |
| 6,037,738 | * 3/2000 | Morita et al. | 318/625 |

FOREIGN PATENT DOCUMENTS

| | | | |
|---|---|---|---|
| 1218172 | * 6/1966 | (DE) | 33/1 PT |
| 2004081 | * 8/1971 | (DE) | 33/1 PT |
| 1352974 | * 8/1966 | (GB) | 33/1 PT |
| 1297111 | * 11/1972 | (GB) | 33/1 PT |
| 146099 | * 3/1962 | (SU) | 33/1 PT |
| 178287 | * 8/1966 | (SU) | 33/1 PT |

OTHER PUBLICATIONS

Brochure Nr. Z1–C–02–237, "bar–Signalbox Positions–Rückmelder", published by "bar GmbH", Dattenberg, Fed. Rep. of Germany, 8 pages, No dates.

* cited by examiner

Primary Examiner—G. Bradley Bennett
Assistant Examiner—Gail Verbitsky
(74) Attorney, Agent, or Firm—W. F. Fasse; W. G. Fasse

(57) ABSTRACT

A position signal transmitter (1) for indicating the position of a servo drive includes a housing (2) adapted to be connected to the servo drive, and a switching shaft (4) that is rotatably supported in the housing and adapted to be coupled in a positive manner to an operating shaft of the servo drive. At least one switching cam (24A, 24B) provided with an internal gearing (28) is mounted on the shaft (4) so that the internal gearing (28) engages an externally geared section (29A, 29B) of the wall of the shaft (4). The externally geared section (29A, 29B) of the shaft wall is elastically deflectable in a substantially radial direction toward the central rotational axis (30) of the switching shaft (4). One or more mechanical or inductive switches are mounted in the housing (2) to be cooperatively actuated by the switching cam. When normal operating torques below a torque threshold are applied to the switching cam, a positive engagement between the internal gearing of the cam and the external gearing of the elastically deflectable section of the shaft wall is maintained, but when a torque exceeding the torque threshold is applied, the switching cam will rotate relative to the shaft while the internal gearing (28) of the cam slips pitch-by-pitch in a ratcheting or detented manner over the external gearing of the elastically deflectable section (29A, 29B), which is thereby elastically deflected temporarily out of meshing engagement. In this manner, it is simple to adjust the angular position of the switching cam on the shaft, for example by using an adjusting tool having an externally geared end that is inserted into a tool access groove in the shaft.

25 Claims, 7 Drawing Sheets

POSITION SIGNAL TRANSMITTER FOR A SERVO DRIVE

PRIORITY CLAIM

This application is based on and claims the priority under 35 U.S.C. §119 of German Patent Application 197 54 271.9, filed on Dec. 6, 1997, the entire disclosure of which is incorporated herein by reference.

FIELD OF THE INVENTION

The invention relates to a position signal transmitter or position signal generating device for indicating the rotational or angular position of the operating shaft of a servo drive, wherein the transmitter includes a housing that can be secured onto the servo drive, a rotatable switching shaft arranged in the housing and adapted to be coupled in a non-slip manner to the operating shaft of the servo drive, at least one switch arranged in the housing, and at least one switching cam that can be selectively positioned in a selected one of a plurality of angular positions and selectively fixed against relative rotation on the switching shaft, so that the switching cam operates the switch and thereby indicates the angular position of the switching shaft and therewith the operating shaft.

BACKGROUND INFORMATION

Position signal transmitters of the above mentioned type are generally known, and are used in a variety of different applications for providing a feedback or answer-back indication of the end position of a member such as an armature that is movably operated by a servo drive. The servo drive, for example, includes a through-going shaft that protrudes from one side of the servo drive to provide a drive shaft for the armature and protrudes from the other side of the servo drive to provide an operating shaft that rotates absolutely synchronously with the drive shaft. The signal transmitter, also known as a position repeater or position feedback indicator, is coupled to the operating shaft to be operated absolutely synchronously with the rotational drive shaft of the servo drive. The dimensions of the protruding operating shaft as well as mounting holes provided on the side of the servo drive for securing the feet of the signal transmitter are standardized, to allow convenient coupling and mounting of the signal transmitter onto the servo drive.

In order to allow the signal transmitter to be adjusted in consideration of the actually existing armature position at the time and place of installation, it is necessary that the switching cams or other switching elements are selectively positionable among a plurality of different angular positions relative to the angular position of the switching shaft. It is known to secure the switching cams or switching elements onto the shaft in a form-locking manner by providing a respective gearing for these respective components. For example, the switching cams or switching elements are provided with an internal gearing, while area of the switching shaft is provided with an external gearing that meshes with the internal gearing of the switching cams or switching elements. Throughout this specification, a "gearing" simply refers to a series or set of gear teeth, which may have any known configuration. In order to nonetheless provide the necessary adjustability of the relative angular position of the cams or the like, the switching shaft must further have a non-geared area adjacent to the externally geared area, and the switching cams or switching elements must be axially slidable off of the externally geared area and onto the non-geared area, where the switching cams or switching elements are then rotatable relative to the switching shaft to achieve the desired rotational adjustment. Then the switching cams are axially pushed back onto the externally geared area of the switching shaft in order to provide the necessary form-locking connection.

It has been found in practice that the above manner of adjusting the rotational position is complicated and impractical, especially when several switching cams or switching elements are arranged axially one above the other. For example, especially if the lowermost switching cam or switching element must be adjusted, it is necessary to axially slide up all of the switching cams or switching elements and thereby disengage all of the switching cams or switching elements from the shaft, just to be able to rotationally adjust the lowermost one of the cams or switching elements. While carrying out this procedure, it can easily occur that one or more of the upper switching cams or elements, which were previously in the correct rotational position, are inadvertently replaced in a wrong rotational position due to their disengagement and renewed engagement with the externally geared portion of the switching shaft. Thus, it becomes necessary to check and ensure the correct angular repositioning of all of the switching cams when the intention was just to reposition the lowermost one of the cams.

The prospectus or brochure Nr. Z1-C-02-237, published by the company "bar GmbH" of Germany, discloses that it is known to provide planet gears for the switching cams for allowing the rotational adjustability. By using a tool, such as a screwdriver, it is possible to press down and then rotate adjustment screws, whereby the respective planetary gearing and therewith also the switching cam can be adjusted. While the adjustment of the switching cams is comparatively easy in this known signal transmitter, the construction of the switching cams provided with a planetary gearing is complicated, and therefore manufacturing the arrangement is expensive.

A further manner of adjusting the switching cams is also known, whereby the switching cams are respectively provided with an end face gearing or spur gearing that respectively cooperates with a corresponding end face gearing or spur gearing provided on an offset shoulder of the switching shaft. An axially acting spring presses the two corresponding spur gearings into engagement with one another, which thereby causes a non-rotational connection, i.e. a connection that does not allow relative rotation, between the switching cam and the switching shaft. In order to carry out a rotational adjustment of the switching cam, the switching cam can be pushed away from the spur gearing provided on the shaft, against the spring force, whereupon the switching cam is rotated into the desired rotational position and then released so that the spring force again pushes the cam into engagement with the spur gearing of the shaft to re-establish a form-locking connection therebetween without the application of any external force.

Carrying out the above described adjustment is, however, rather impractical because it can be rather difficult to manually slide or push the switching cams in the axial direction against the effect of the biasing springs and then rotate the switching cams while maintaining the pressure against the spring force. This is especially difficult under tight space conditions, whereby especially the various components installed within the housing of the signal transmitter all become a great hindrance. Moreover, the absolute size of each of the switching cams as well as the overall housing is rather small, so that carrying out the adjustment accurately requires a considerable level of skill and fine fingertip feeling and control.

Another problem that arises in conventional position signal transmitters is that it becomes rather complicated and difficult to properly mount and connect the mechanical or inductive switches in the housing, due to the tight or cramped space conditions within the housing, and due to the small size of the individual components. A pre-assembly of the switches simultaneously with the assembly or manufacturing of the signal transmitter is not possible because different types of switches must be selected from among a great number of standard switch types, depending on the particular application and the special needs of the ultimate user of the position signal transmitter.

In an attempt to address the above problem, the above mentioned brochure No. Z1-C-02-237 of the company "bar GmbH" discloses an arrangement in which the switches as well as further electrical or electronic components are pre-mounted on a mounting plate. With such a known arrangement, the standardized mounting plate always has the same dimensions and two mounting holes adapted to receive mounting screws that are screwed into corresponding threaded holes provided in the floor of the housing. However, the problem remains that the arrangement of components on the mounting plate is variable and must be adapted to the individual needs of the respective ultimate user of the device in each case. Thus, the simplified assembly and wiring of the switches can only be achieved in combination with the serious disadvantage that a plurality of differently prepared mounting plate arrangements must be manufactured and stored in inventory in order to meet the needs of consumers of the device. This leads to high costs for the production and the inventory of the devices.

SUMMARY OF THE INVENTION

In view of the above, it is an object of the invention to provide a position signal transmitter which allows a substantially simplified assembly, installation and adjustment by the ultimate user of the device. More particularly, it is an object of the invention to provide a position signal transmitter which allows a simplified correct rotational positioning of the switching cams or switching elements on the switching shaft as well as a simplified installation, assembly and wiring of mechanical and/or inductive switches arranged in the housing of the signal transmitter. The invention further aims to avoid or overcome the other disadvantages of the prior art, and to achieve additional advantages, as apparent from the present description.

The above objects have been achieved according to the invention in a position signal transmitter adapted to be coupled to a servo drive, comprising a housing, a switching shaft rotatably arranged within the housing, at least one switching member mounted on the switching shaft to be selectively fixed on the switching shaft to prevent relative rotation therebetween in a selected one of a plurality of rotational or angular positions, and a switch arranged in the housing so as to be operated or actuated by the switching member. The switching member and the switch may operate either mechanically or electromagnetically. For example, the switching member may be a mechanical switching cam while the switch is a mechanical switch, or the switching member may be an electromagnetic or inductively detectable switching element that cooperates with an inductive switch.

Further especially according to the invention, the inner wall surface of an opening in each switching member is provided with an internal gearing that can selectively be brought into engagement with at least one associated correspondingly externally geared section of the switching shaft. The switching shaft further includes non-geared or smooth cylindrical areas or sections adjacent to the externally geared sections. The externally geared section of the switching shaft is elastically movable, for example elastically depressible or deflectable, in a substantially radial direction toward the central rotational axis of the switching shaft.

A first important feature of the invention is the combined provision of an internal gearing in an opening in the switching member such as a switching cam or electromagnetic switching element, cooperating with an external gearing provided on an elastically movable section of the switching shaft. Due to the elastic movability or deflectability of the externally geared section of the switching shaft, it is possible to selectively move the externally geared shaft section into or out of engagement with the internal gearing of the switching member.

More specifically, in the preferred embodiment, the externally geared section of the switching shaft is normally elastically pressed into engagement with the internal gearing of the switching member, which thus provides a form-locking intermeshing connection therebetween. However, due to the elastic deflectability of the externally geared section of the shaft, the form-locking connection is maintained only for rotational moments or torques applied relatively between the switching member and the switching shaft up to a torque limit or threshold. Once a rotational moment or torque exceeding the threshold is applied to the switching member relative to the switching shaft, the externally geared section of the shaft is automatically elastically deflected sufficiently to allow the switching member to rotate relative to the switching shaft. Thus, the externally geared, elastically movable section of the shaft acts as a selectively yielding detent that fixes the switching member against rotation only up to a certain applied rotational moment, but allows a slipping of the gears when a higher torque is applied.

Since the rotational moments arising in normal operation of the switching member are rather low, the form-locking connection between the switching member and the switching shaft is positively maintained without allowing relative rotation between the switching member and the switching shaft in normal operation. In other words, the rotational moment threshold or limit above which the detent arrangement allows relative rotation is greater than the relative rotational moments that arise during normal operation. More specifically, the rotational moments necessary for operating a mechanical switch in the case of the switching member being a mechanical switching cam are rather low, and substantially below the rotational moment limit or threshold, while the rotational moments necessary for operating an inductive contact-less switch in the case of the switching member being an inductively detectable switching element are approaching zero, and thus clearly well below the rotational moment limit or threshold. The torque threshold value can be designed or selected as desired, by appropriately selecting the configuration and material of the elastically movable externally geared section of the switching shaft, the slope angle of the gear teeth, the angular range and number of gear teeth included in the gearings, and the like.

In order to adjust the angular position of the switching member on the switching shaft, it is simply necessary to apply to the switching member an appropriate torque exceeding the torque threshold in the desired rotation direction. This will cause an elastic displacement of the externally geared section of the switching shaft in a generally radial direction toward the central rotational axis, i.e. a direction out of engagement with the internal gearing of the switching member. This causes a temporary disengagement of the form-locking interconnection and thus allows a relative rotational movement of the switching member around the switching shaft. This radial displacement of the externally geared section of the shaft is enabled especially due to the sloping of the flanks of the individual gear teeth, which allow the respective opposed teeth of the internal gearing and of the external gearing to slide up on each other and then jump over into the next pitch engagement of the respective gear teeth. Namely, this allows a detented or pitch-by-pitch rotational slipping of the two components as long as a sufficiently large torque is applied to the switching member relative to the switching shaft. Once the externally geared section of the shaft is depressed radially, the switching member can freely rotate around the shaft, because the shaft does not include external gearing in areas other than the elastically deflectable section or sections. Particularly, the remaining portion of the circumference of the shaft in the plane of the externally geared section is a smooth cylindrical shaft surface.

According to a particular embodiment of the invention, the switching shaft is a hollow shaft, and the externally geared section is a tab or tongue-shaped elastically deflectable portion of the wall of the hollow shaft. In other words, the external gearing is provided on a tab or tongue that is connected to the rest of the wall of the hollow shaft by a web or stem. Particularly, the externally geared deflectable section may have a substantially quadrilateral shape, whereby three sides are separated from the rest of the wall of the hollow shaft, and only one side is connected to or integrally extending from the wall of the hollow shaft through the connecting web. This provides a very simple structure for realizing the elastic deflectability of the externally geared section in a direction toward the central rotational axis of the switching shaft. Due to the construction of the shaft as a hollow shaft, the space required for radially deflecting the externally geared section toward the central rotational axis is readily available in the hollow core space within the hollow shaft. Also, the natural elastic characteristics of the material forming the externally geared section are used for providing the required elastic return force opposing the radial deflection. In view of achieving reduced manufacturing costs, it is especially advantageous if the spring-elastic part forming the externally geared section is separated from the rest of the wall of the hollow shaft by a simple U-shaped opening in the hollow wall. Such an opening can easily be formed in the hollow shaft during the injection molding fabrication of the shaft.

A further feature of the invention allows the necessary torque to be applied to the switching members to carry out the desired rotational positional adjustment. To achieve this, the switching shaft is configured to have a groove with a semi-circular or semi-oval cross-sectional shape extending lengthwise parallel to the central rotational axis, with the groove opening as a slot along the outer surface of the shaft. The groove preferably extends from the free end of the shaft opposite the end that will be coupled to the servo drive, to the respective area at which the internal gearing of the respective switching member is located. Thus, a suitable externally geared adjusting tool can be inserted into this groove in such a manner that the tool's external gearing engages the internal gearing of the particular selected switching member that is to be adjusted, while it remains mounted on the shaft. By rotating the adjusting tool, the necessary torque can be applied to the switching member, while the handle end of the tool is as far outside the signal transmitting device as necessary for comfortable use thereof, without requiring disassembly of the components or a direct manipulation of the switching member itself.

According to a further particular embodiment, in which the position signal transmitter includes two switching members, i.e. switching cams or switching elements, arranged next to each other in the axial direction along the switching shaft, then there are also correspondingly two of the above described tool-access grooves provided diametrically opposite each other along the switching shaft. Also, a diametrically opposed pair of the externally geared sections of the shaft wall are provided for engaging each respective one of the switching members, whereby the two respective pairs of externally geared sections of the shaft wall are displaced from each other in the axial direction so as to cooperate respectively with the two adjacently arranged switching members. Particularly, the two diametrically opposite tool access grooves are uniformly circumferentially offset, i.e. by 90°, relative to the externally geared sections of the shaft. If more than two switching members are to be arranged on the shaft, and a corresponding plurality of the tool access grooves are to be provided, then the tool access grooves must be arranged circumferentially offset from each other and from the externally geared sections of the shaft wall at a different angular offset, other than 90°, in order to avoid a collision or conflict of the several tool access grooves and externally geared sections. The circumferential offset necessary will depend on the number of separate tool access grooves that are to be provided.

In order to functionally link each respective tool access groove with a respective one of the switching members, the axial length of each tool access groove extends respectively to the plane of the internal gearing of a respective one of the switching members. In this manner, a selective or targeted adjustment of each selected individual one of the switching members can be carried out "one at a time" and independently of the others, simply by inserting the adjusting tool into the proper tool access groove associated with that selected switching member. Since each tool access groove has a particular axial length or depth corresponding to the axial position of the associated switching member, it is a very simple matter to simply insert the adjusting tool to the full depth or axial length of the respective groove, whereby the external gearing of the tool engages the internal gearing of the selected switching member, without having to judge the proper distance of inserting the tool so as to engage the proper one of the switching members.

Moreover, the adjusting tool can be used to reach and adjust both of the switching members individually, without interference by the respective other switching member. Namely, to adjust the rotational position of the bottom switching member, i.e. the switching member further from the free end of the shaft at which the tool is inserted, the tool is simply inserted into the appropriate corresponding tool access groove, and pushed through the central opening and past the internal gearing of the upper switching member, so as to finally bring the external gearing of the tool into engagement with the internal gearing of the lower switching member. In that arrangement, a non-geared shaft portion of the tool passes by the internal gearing of the upper switching member with a spacing therebetween, so that there is no engagement or interference between the tool and the upper switching member.

It has been found that it is possible to achieve a good compromise value of the torque threshold that is sufficiently high to ensure a reliable form-locking engagement during normal operation, yet sufficiently low to allow the necessary relative rotation between the switching member and the switching shaft by applying an acceptable level of force with the above describe tool for carrying out an adjustment. This compromise value is achieved by configuring the externally geared section of the switching shaft to extend over an angular range of 30° to 50°, while using typical commercially available materials and processes for fabricating the shaft. With such an arrangement or configuration, it is a simple matter to provide two diametrically opposite externally geared sections while still providing sufficient space for the necessary adjustment tool access grooves respectively circumferentially between the diametrically opposed externally geared sections.

A second important feature of the invention is that the mechanical and/or inductive switches are removably mounted on a base support plate, which in turn is connected to the housing in a form-locking manner in a plane perpendicular to the central rotational axis of the switching shaft, such that the base support plate together with the switches mounted thereon can be removed from the housing as a unit in the direction axially along the switching shaft.

With such an arrangement, the switches and possibly other electrical or electronic components can be individually mounted on the base support plate while the plate is separate from, i.e. not mounted in, the housing. In this manner, the component mounting and assembly step can be conveniently carried out outside of the confining or cramped space of the housing. Once the base support plate has conveniently been pre-assembled with the several components mounted and wired together thereon, then this assembly can easily be inserted into the housing in such a manner that a form-locking connection between the base support plate and the housing is automatically established. The effort and expense of the assembly procedure can be considerably reduced in this manner, and the convenience of carrying out the necessary steps is substantially improved.

A further reduction of the effort and expense of carrying out the assembly is achieved in that the individual switches may be mounted on and connected to the base support plate by means of elastic snap hooks. The base support plate may be manufactured as a standardized structural unit, in that it is provided with a plurality of snap hooks suitable for engaging different structural types and configurations of mechanical and/or inductive switches and other components. In view of the great number of parts to be produced, the production costs can be considerably reduced by such a standardized configuration. Moreover, the standardized configuration will allow a reduced inventory to be maintained because it will no longer be necessary to keep on hand a supply of several different types or configurations of pre-assembled base plates, as was necessary in connection with the prior art position signal transmitters.

A very advantageous embodiment of the position signal transmitter according to the invention is achieved when the housing is substantially cylindrical and the base support plate suitably fitted to the housing is essentially round. The inventive form-locking connection between the base support plate and the housing is achieved in a particularly elegant manner in that the base support plate is provided with recesses, openings or notches into which holding elements connected to the housing engage when the base support plate is in its mounted condition. These holding elements may also be embodied as snap hooks for example, so that the installation of the pre-assembled base support plate simply requires setting the base support plate into the housing and snapping it in place so as to be engaged by the snap hooks, without any further effort.

BRIEF DESCRIPTION OF THE DRAWINGS

In order that the invention may be clearly understood, it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

Figure 1:
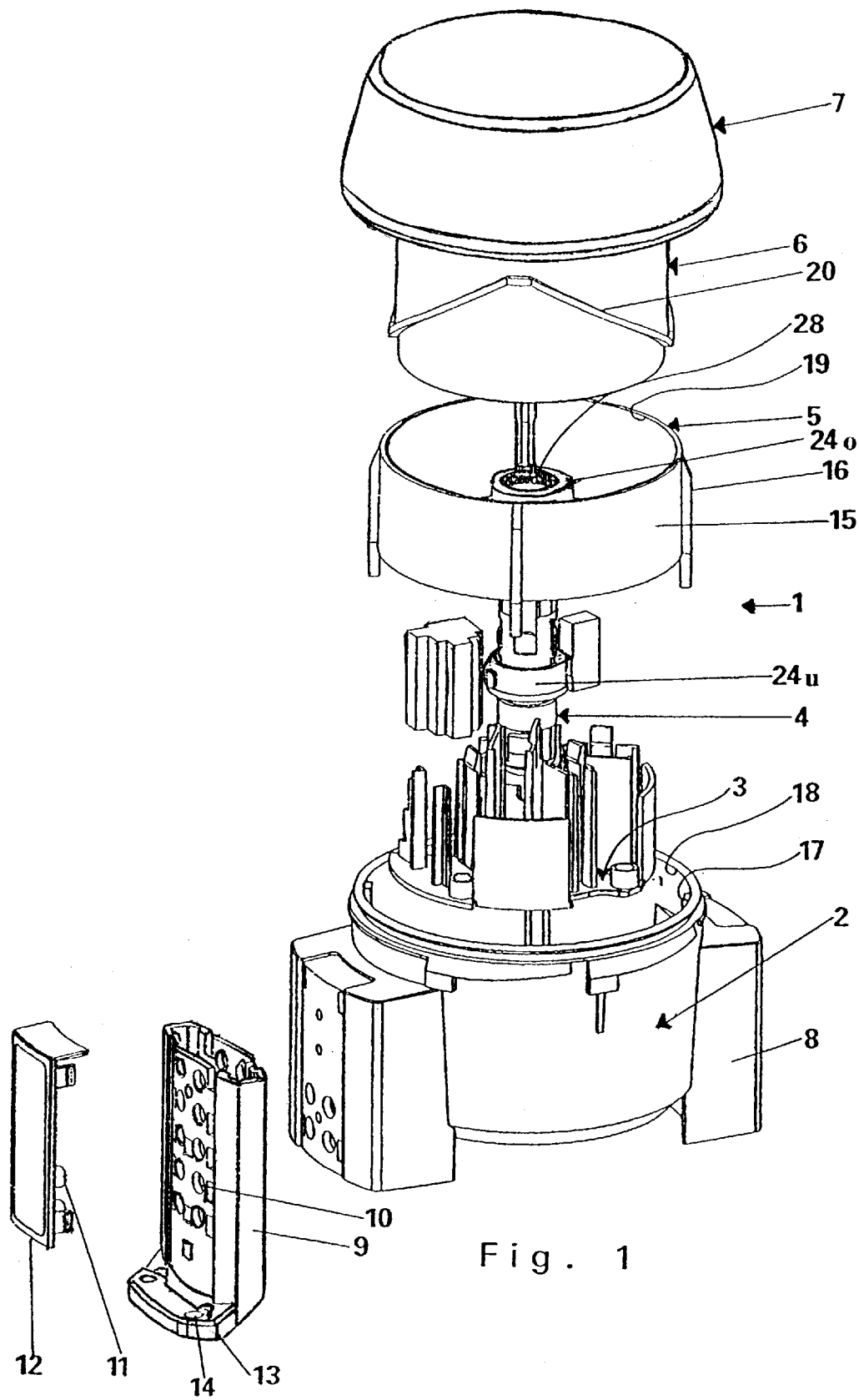
FIG. 1 is an exploded view of a position signal transmitter according to the invention, including a housing, base support plate, switching shaft, and cover hood.

FIG. 1 shows a general overview, in the manner of an exploded view, of a position signal transmitter 1 adapted to be connected to a servo drive, which is not shown. The position signal transmitter 1 essentially comprises a housing 2, a base support plate 3 that can be inserted or installed in the housing 2, a switching shaft 4 that is rotatably mountable in the housing 2 and is adapted to be coupled to and rotationally driven by an operating shaft of the servo drive, an indicator ring 5, a cam sleeve 6, and a cover hood 7. Two stand-foot receivers 8 that are each respectively adapted to receive an angled stand-foot 9 are attached to the outside of the housing 2 at diametrically opposed locations.

The stand-feet 9, which each respectively have a crowned or bulging cross-sectional shape, each include a plurality of paired holes 10 arranged one above the other. Snap-in bolts or studs 11 of a snap-in-place securing cover plate 12 can be selectively inserted through a respective pair of the holes 10 so as to secure the respective stand-foot 9 at the desired height in the foot receiver 8. More particularly, the feet 9 can be arranged in two different positions in corresponding fitting recesses or grooves within the stand-foot receivers 8. In one of the possible configurations, the respective stand-bases 13 of the two feet 9 are directed toward one another, while in the other configuration they are directed away from each other. In this manner, both the height of the signal transmitter 1 as well as the position and relative spacing between the holes 14 provided in the stand bases 13 for securing the position signal transmitter 1 onto the servo drive can be varied or adjusted to fit different standardized sizes of servo drives.

Four axially extending guide rails or webs 16 are arranged at uniformly distributed circumferential locations and protrude radially outwardly from the outer shell surface 15 of the indicator ring 5. The inner shell surface 18 of the housing 2 is provided with four guide grooves 17 that are correspondingly fitted to the guide rails 16, such that the guide rails 16 are respectively axially slidably guided in the guide grooves 17, so that the indicator ring 15 can move only in the axial direction. Furthermore, the cam sleeve 6 has a cam track 20 on the outer surface thereof, while the inner shell surface 19 of the indicator ring 5 has two cam track followers (not shown) thereon, which engage and followingly cooperate with the cam track 20 of the cam sleeve 6.

In the present embodiment, the cam track 20 is preferably a protruding cam rail, but it could equivalently be a cam groove let into the outer surface of the cam sleeve 6. As shown in FIG. 1, the cam track 20 has a pattern of portions that slope alternately in opposite axial directions. In the assembled condition of the signal transmitter 1, the cam sleeve 6 is connected to the switching shaft 4 in a form-locking or form-engaging manner such that a rotation of the switching shaft 4 correspondingly rotates the cam sleeve 6, whereby the cooperation of the cam track 20 of the cam sleeve 6 with the cam track followers provided on the inner surface 19 of the indicator ring 5, which is further constrained by the guide rails 16 slidingly engaged in the guide grooves 17, results in an axial movement of the indicator ring 5.

The above described axial movement of the indicator ring 5 resulting directly from a rotation of the switching shaft 4 gives a visual indication of the position of the servo drive, as follows. The cover hood 7 is preferably made of a transparent material, while at least the upper portion of the cam sleeve 6 is preferably colored a first clearly distinguishable color, such as red, while the indicator ring 5 is preferably colored a second clearly distinguishable color, such as green. The housing 2 is opaque, i.e. non-transparent. With this arrangement, depending on the rotational position of the switching shaft 4 and therewith the cam sleeve 6, the indicator ring 5 will be moved correspondingly between first and second, namely bottom and top, end limit positions. In the first or bottom limit position, the indicator ring 5 will be completely covered or hidden within the opaque housing 2, while the upper portion of the cam sleeve 6 will be exposed. Accordingly, in this position, the red upper portion of the cam sleeve 6 will be clearly visible through the transparent cover hood 7. On the other hand, when the indicator ring 5 is in the second or top limit position, the green indicator ring 5 will cover the red cam sleeve 6 while itself being visible through the transparent cover hood 7. Thus, the respective position of the servo drive and therewith the position of the armature driven by the servo drive will be clearly visually indicated in all directions, even at a great distance, by the appearance of either the red cam sleeve 6 or the green indicator ring 5 within the transparent cover hood 7.

Figure 2:
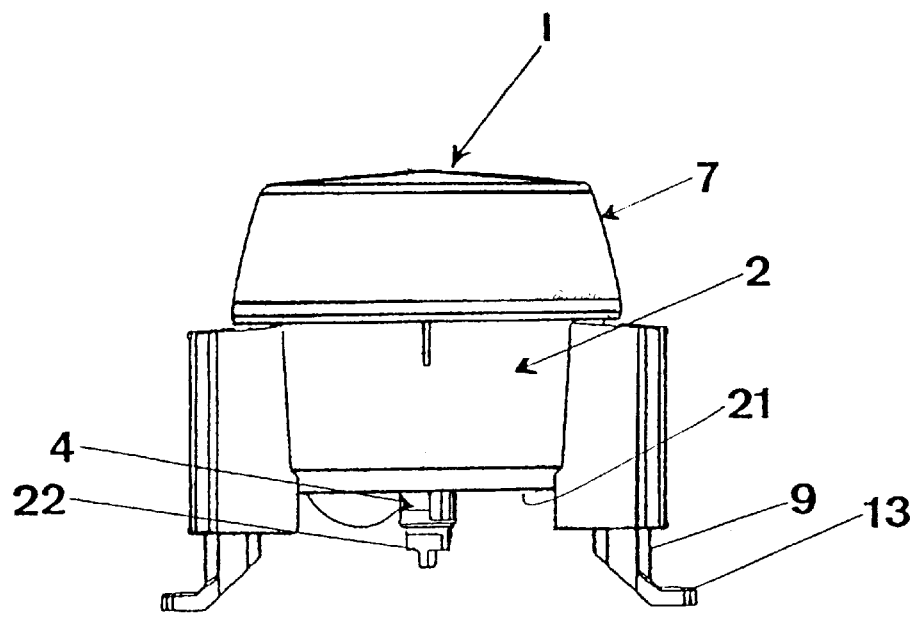
FIG. 2 is a side view of the position signal transmitter according to FIG. 1, fully assembled.
Figure 3:
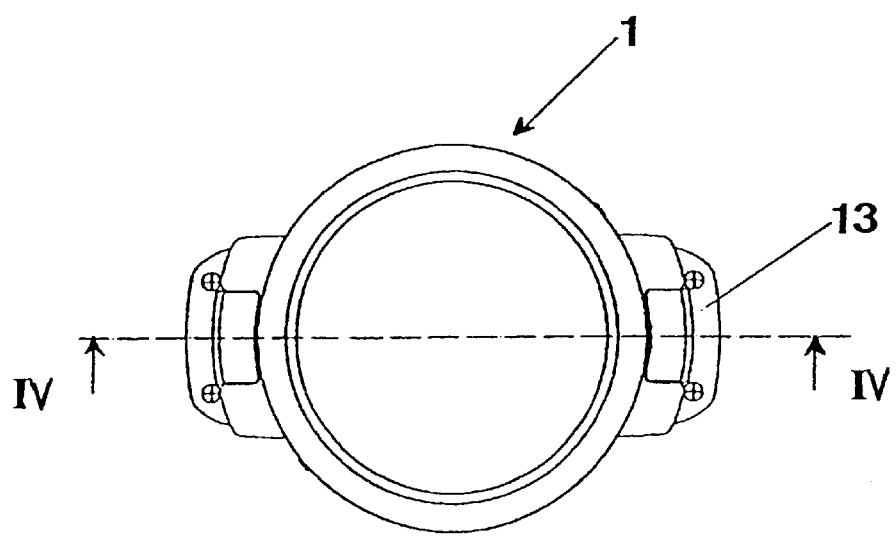
FIG. 3 is a top view of the position signal transmitter according to FIG. 2.

FIGS. 2 and 3 show the assembled condition of the signal transmitter 1, whereby the stand-feet 9 are arranged with the stand-bases 13 pointing outwardly away from each other. As can be clearly seen in these Figures, both the housing 2 and the cover hood 7 are substantially cylindrical or barrel-shaped. As shown in FIG. 2, a lower end portion of the switching shaft 4 protrudes outwardly from the bottom surface 21 of the housing 2 and includes a coupling shaft stub 22 by which the switching shaft 4 may be coupled in a form-locking manner to an end of the operating shaft of the servo drive having a corresponding mating configuration.

Figure 4:
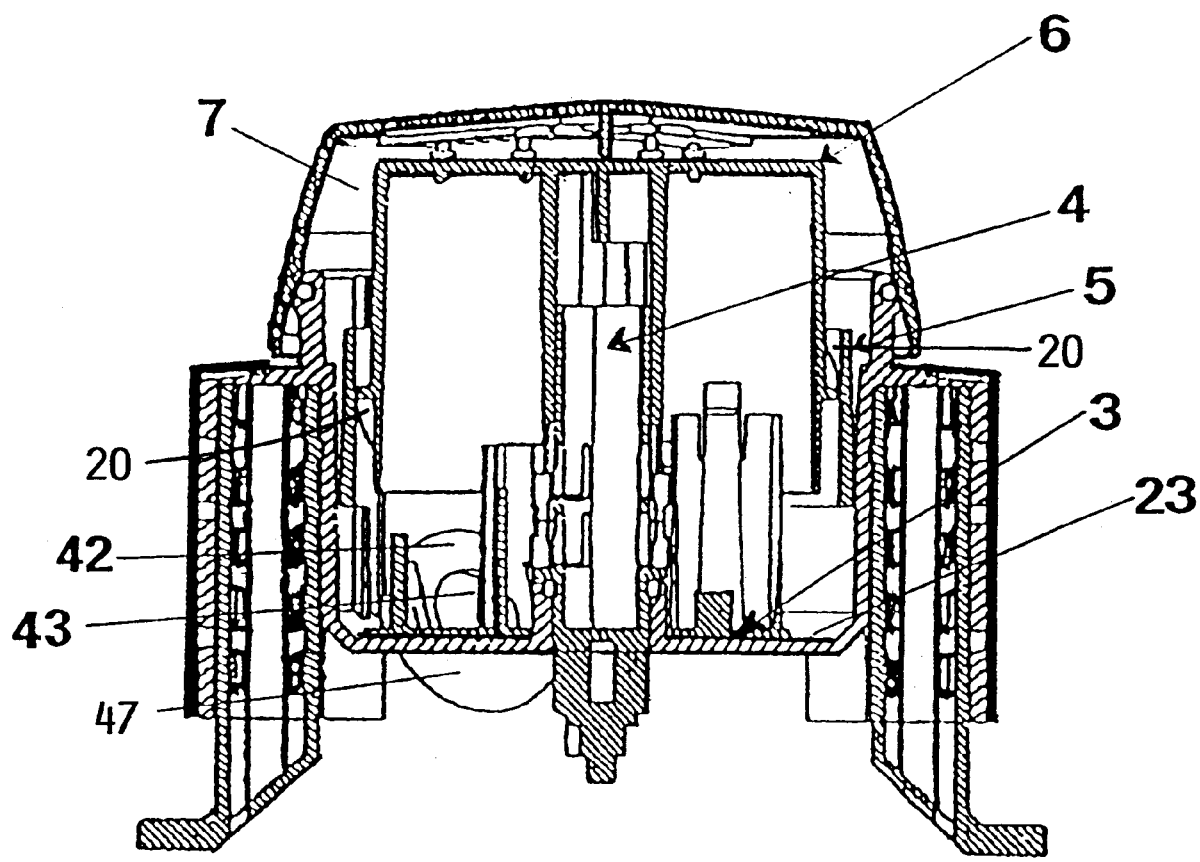
FIG. 4 is a sectional view of the position signal transmitter, taken along the section line IV—IV as shown in FIG. 3.

The sectional view of FIG. 4 further clarifies how the cam sleeve 6 is secured or supported on an upper portion of the switching shaft 4 in a manner preventing relative rotation therebetween. FIG. 4 shows the indicator ring 5 in the above described bottom limit position and further clarifies how a rotation of the switching shaft 4 will move the indicator ring 5 into the top limit position in which it surrounds or covers the upper portion of the cam sleeve 6 and thus becomes visible from the outside the transparent cover hood 7. FIG. 4 further shows how the base support plate 3 is arranged on a floor 23 of the housing 2 in the installed condition. The pre-assembly of the base support plate 3 and its installation into the housing 2 will be further described below.

Figure 5:
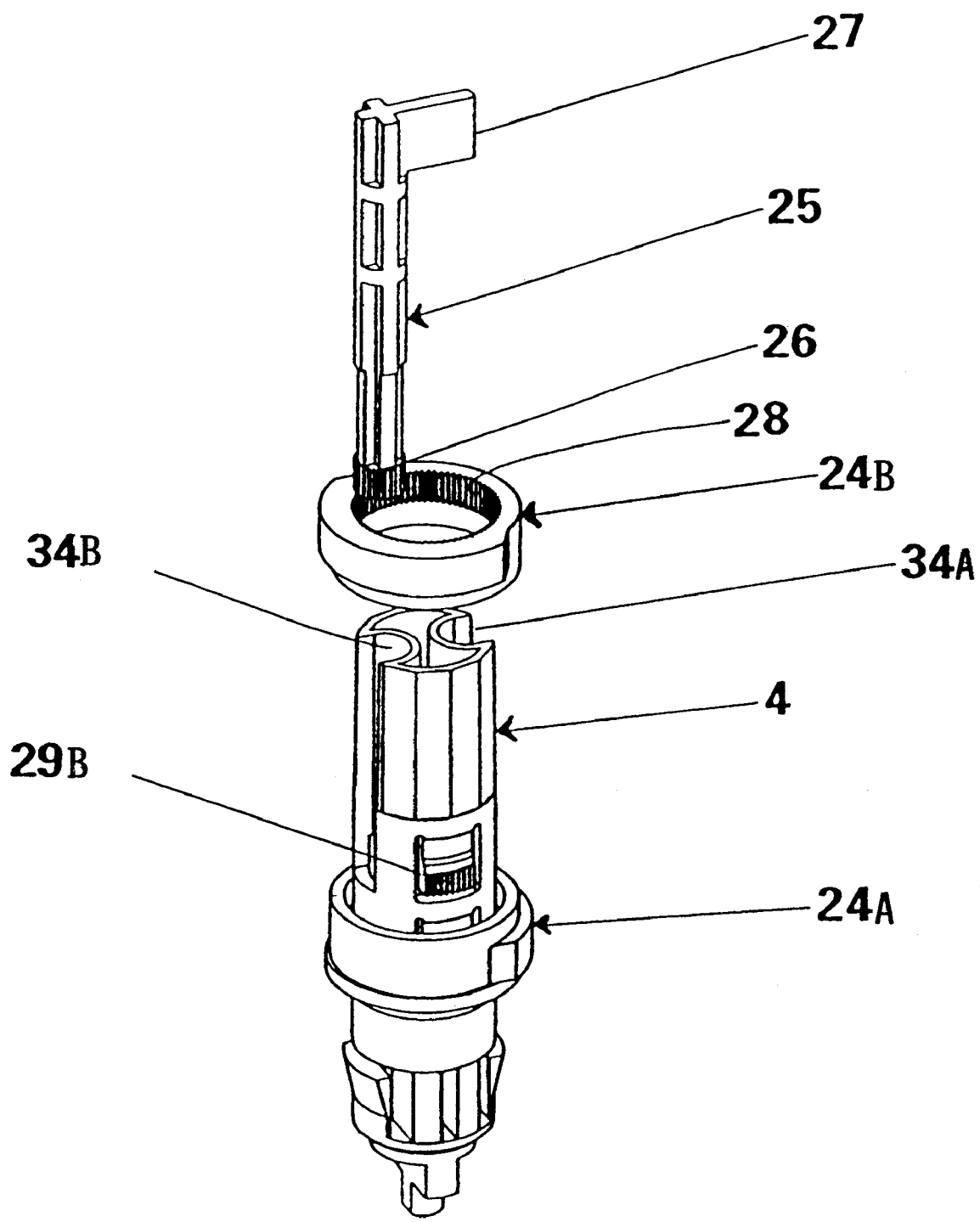
FIG. 5 is a partially exploded perspective view of the switching shaft, two switching cams, and an adjusting tool, shown isolated or separated from the rest of the apparatus.

FIG. 5 shows a perspective view of the switching shaft 4, with a lower switching cam 24A mounted thereon, and an upper switching cam 24B removed or pulled off of the shaft 4 in an exploded view fashion, for clearly illustrating the externally geared section 29B as will be described below. Above the upper switching cam 24B, a generally rod-shaped adjusting tool 25 is illustrated, also in an exploded view fashion, in a position ready to be inserted into a tool access groove 34B extending axially along the shaft 4. The adjusting tool 25 includes a main tool shaft with an external gearing 26 provided on the bottom end thereof, and a handle or grip 27 provided at the upper end thereof. The two switching cams 24A and 24B are embodied as generally annular or ring-shaped cams, including a main ring body and a cam surface protruding therefrom. Each switching cam 24A and 24B has a central through-going hole therein, of which the inner wall surface is provided with an internal gearing 28. When the switching cams 24A and 24B are installed on the switching shaft 4, the internal gearing 28 of each switching cam 24A and 24B respectively engages and cooperates with the external gearing of externally geared sections 29A and 29B of the switching shaft 4, so that a form-locking or form-engaging connection arises between the switching shaft 4 and the switching cams 24A and 24B.

Figure 6:
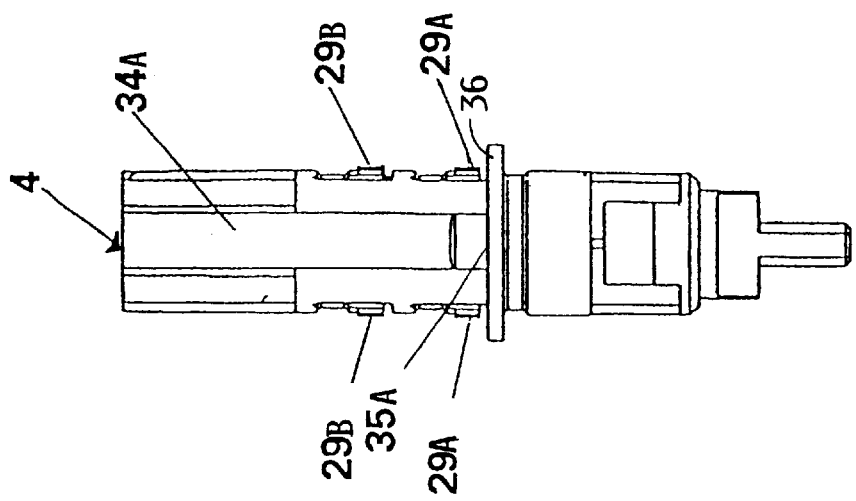
FIG. 6 is a side view of the switching shaft of the position signal transmitter apparatus according to the invention.

As especially shown in the sectional view of FIG. 6, the externally geared sections 29A and 29B of the switching shaft 4 include one pair of diametrically opposed lower sections 29A and one pair of diametrically opposed upper sections 29B. The respective paired upper sections 29B are arranged axially above the paired lower sections 29A with a small axial spacing therebetween. Thus, there is also a pairing of externally geared sections 29A and 29B on one side of the shaft 4, and correspondingly on the diametrically opposed side of the shaft 4, for example as evident in FIGS. 7, 8 and 9.

Figure 8:
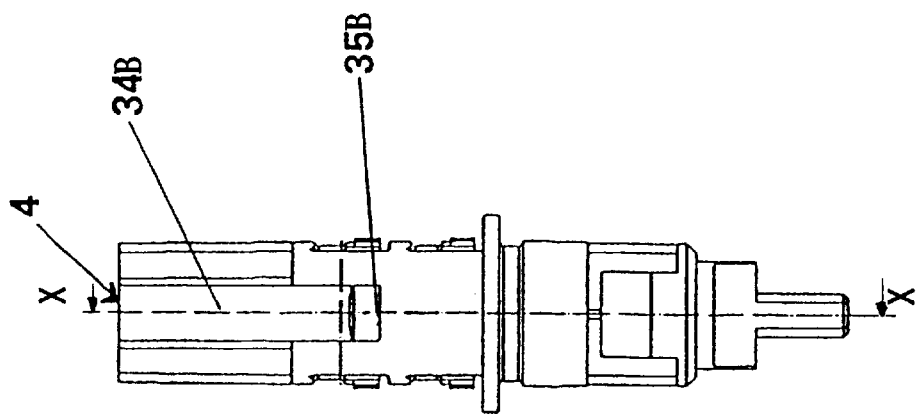
FIG. 8 is another side view of the switching shaft of FIG. 6, but rotated by 180°.
Figure 7:
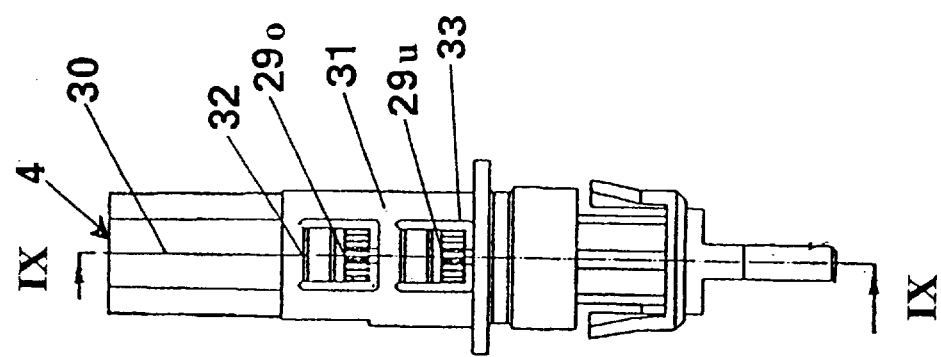
FIG. 7 is another side view of the switching shaft shown in FIG. 6, but rotated by 90°.
Figure 9:
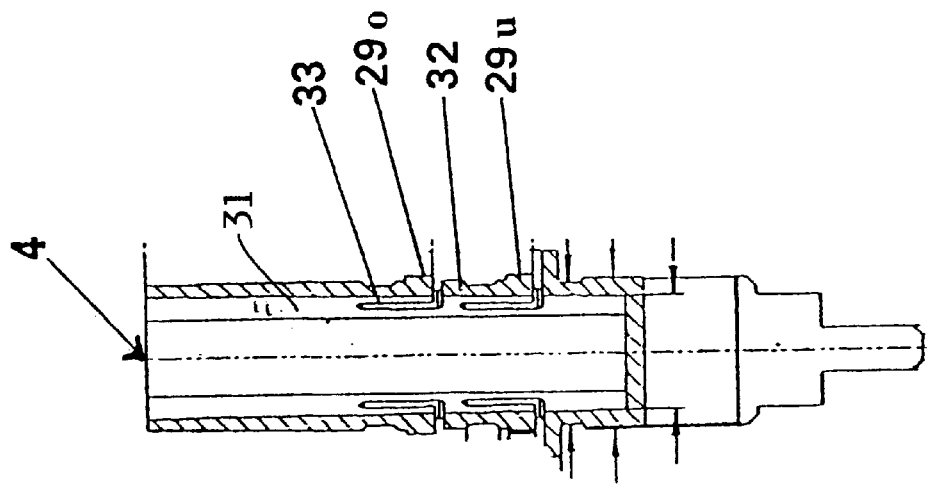
FIG. 9 is a sectional view of the switching shaft taken along the section line IX—IX as shown in FIG. 7.

As can be seen in FIGS. 7, 8 and 9, as well as the perspective view of FIG. 5, the externally geared sections 29A and 29B are each formed as a spring-elastically flexible part of the wall 31 of the switching shaft 4, which is embodied as a hollow shaft. These tab or tongue-shaped sections 29A and 29B are preferably integrally formed with the wall 31, in that they are respectively connected to the wall 31 integrally by a remaining connecting web 32 along one edge of the sections 29A and 29B, while three edges of the sections 29A and 29B respectively are formed and bounded by a generally U-shaped opening 33 in the wall 31 (see especially FIG. 7 and 9).

With the above described configuration, the sections 29A and 29B are elastically deflectable in a generally radial direction toward the central rotational axis 30 of the switching shaft 4. When a sufficiently high torque is applied to the cams relative to the shaft, the resulting forces applied by the internal gear teeth of the switching cams 24A and 24B onto the external gear teeth of the sections 29A and 29B generate a radially directed force component that radially elastically deflects the sections 29A and 29B toward the central axis 30 to a sufficient extent to allow a ratcheting or detented rotational slipping of the internal gearing over the external gearing.

For this reason, the form-engaging connection between the internal gearing 28 of the switching cams 24A and 24B (see FIG. 5) and the external gearing of the sections 29A and 29B of the switching shaft 4 can be released or selectively overcome by applying a torque to the switching cams 24A and 24B that exceeds a certain specified torque limit or threshold. For any torque up to this threshold, a rotationally fixed connection, i.e. a connection preventing relative rotation, is maintained between the switching cams 24A and 24B and the switching shaft 4. On the other hand, when a torque above the threshold is applied to the cams relative to the shaft, the switching cams 24A and 24B will be purposely rotated relative to the shaft in a pitch-by-pitch detented slipping manner. This detented rotational sliding or slipping of the gearings adjusts the angular position of the cams on the shaft and thereby also adjusts the respective switching angles. In this manner, it is possible to carry out a fine adjustment of the signaling characteristic of the signal transmitter 1 at the location of installation, in order to achieve a fine tuned correspondence between the actual position of the armature being driven by the servo drive and the indicated position signal. The degree of fine tuning that is achievable is determined by the pitch of the internal gearing of the switching cams 24A and 24B and the mating external gearing of the sections 29A and 29B.

The application of the necessary torque for adjusting the rotational position of the switching cams 24A and 24B is achieved by means of the adjusting tool 25 shown in FIG. 5. The externally geared end 26 of the tool 25 is positioned respectively circumferentially between two of the spring-elastic externally geared sections 29A and 29B and then brought into engagement with the internal gearing of the selected switching cam 24A or 24B. By firmly twisting the handle or grip 27 of the tool 25 with the necessary force, the required torque is applied to the engaged switching cam 24A or 24B so that it is rotated relative to the shaft 4 in a slipping, ratcheted or detented manner.

In order to enable the above described engagement of the adjusting tool 25 with the switching cams 24A and 24B in the fully assembled and installed condition of the signal transmitter 1, two axially extending tool access grooves 34A and 34B are provided on two diametrically opposite sides of the hollow switching shaft 4. As can be seen by comparing FIGS. 6 and 8, further in combination with FIG. 10, a first one of the grooves 34A has a longer axial length that extends all the way to the internal gearing 28 of the lower switching cam 24A, while a second one of the grooves 34B has a shorter axial length that only extends to the axial position of the internal gearing 28 of the upper switching cam 24B. In this manner, the adjusting tool 25 may be inserted into the respective groove 34A or 34B, all the way until the externally geared end 26 of the tool 25 comes to rest against the corresponding end stop surface 35A or 35B of the groove, at which point the externally geared end 26 of the tool 25 will be properly positioned for engaging the internal gearing 28 of the proper selected switching cam 24A or 24B. When being inserted into the longer groove 34A, the externally geared end 26 of the tool 25 is simply pushed past the upper switching cam 24B until it properly engages the lower switching cam 24A as described above. In this manner, it is possible to adjust the rotational position of only the lower switching cam 24A, if necessary, in the fully assembled condition of the signal transmitter 1, without out first having to disassemble or reposition the upper switching can 24B.

Figure 10:
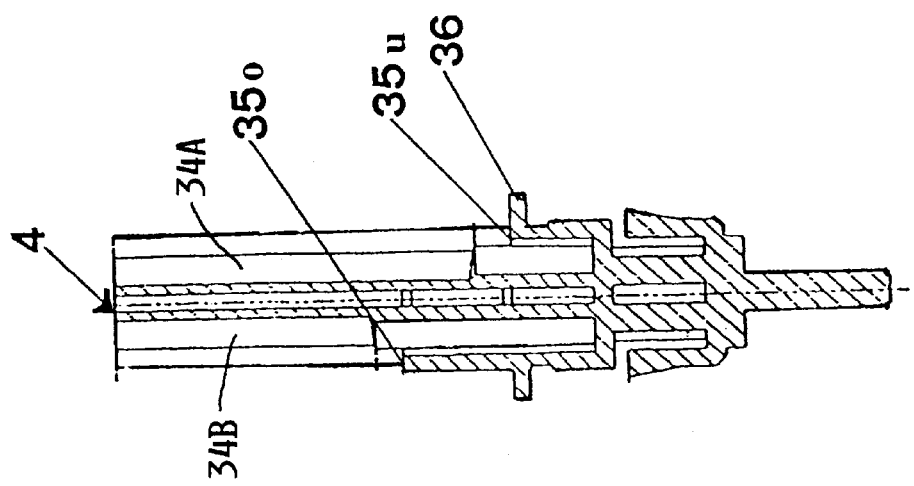
FIG. 10 is another sectional view of the switching shaft taken along the section line X—X as shown in FIG. 8.

As can be seen especially in FIGS. 6 and 10, the longer tool access groove 34A preferably extends all the way to a circumferentially extending collar or band 36, which thereby forms the stop surface 35A. The lower switching cam 24A in its installed position will be supported axially against this circumferential collar 36, while the upper switching cam 24B may in turn be axially supported against the lower switching cam 24A.

Figure 11:
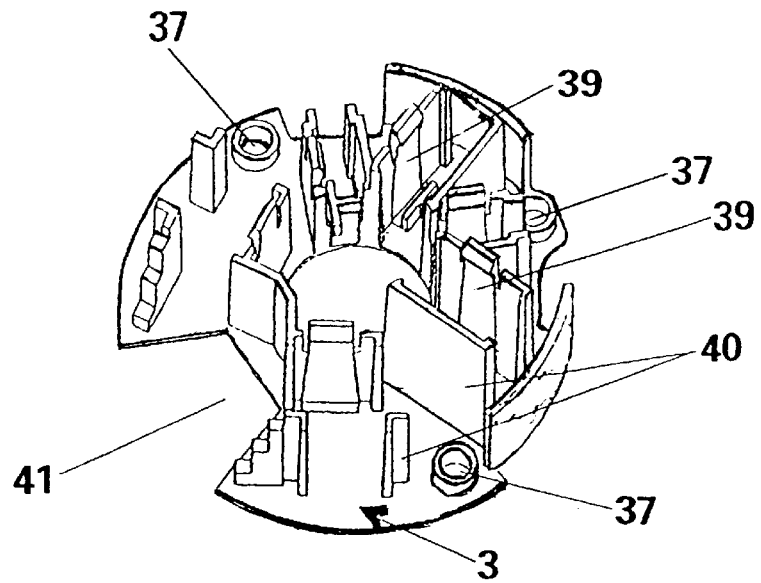
FIG. 11 is a perspective view of the base support plate according to the invention, as shown separate from the housing and other components of the present position signal transmitting apparatus.
Figure 12:
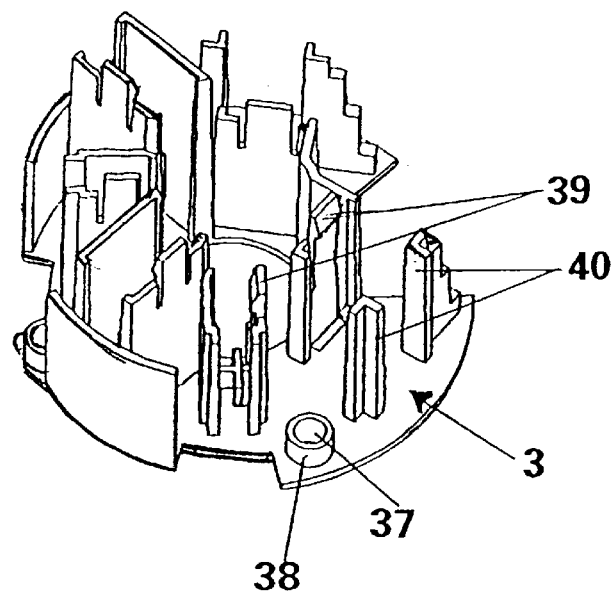
FIG. 12 is another perspective view of the base support plate of FIG. 11, as seen in a different view direction.
Figure 13:
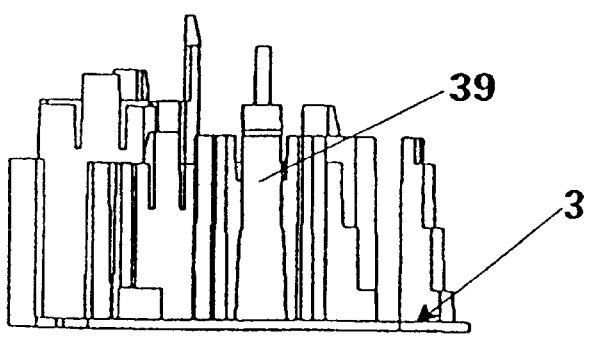
FIG. 13 is a side view of the base support plate of FIG. 11.

The base support plate 3 shown in FIGS. 11 to 13 serves as the supporting base on which the mechanical and/or inductive switches are mounted. For reasons of clarity, the switches themselves are not shown in the drawings. These switches can be any conventional type of switch, that can be actuated by a mechanical switching cam or by an inductively detectable switching element, or even by an optically operating switching arrangement. As is generally known, with the mechanical switching arrangement, the cam surfaces of the switching cams 24A and 24B mechanically contact and run along a cam follower connected to the mechanical switch to achieve the switch operation, while the inductive switches are switched in a contact-less manner by the associated switching elements. These may, for example, be embodied by providing curved metal plates set into curved or ring-shaped pockets in the switching cams 24A and 24B, such that these metal plates can be detected or sensed by the inductive switches in a contact-free manner. Thus, one and the same assembly of the switching shaft with the switching cams arranged thereon can be used in connection with either mechanical switches or inductive switches, i.e. the switching cams with the curved metal plates embedded or inserted therein simultaneously serve the functions of a mechanical switching cam or a contact-free switching element.

As can be seen from FIGS. 1 and 4, the base support plate 3 in its installed condition is arranged on the floor 23 of the housing 2. But in order to allow the individual switches to be mounted on the base support plate 3 in a simple and convenient manner, the base support plate 3 is removable from the housing 2 in an axial direction. In other words, the several switches are first mounted on the base plate 3, and thereafter the pre-assembled base plate arrangement is installed in the housing 2 by simply axially pushing it into the proper position in the housing. In order to prevent a relative rotation of the base support plate 3 within the housing 2 as a result of the rotation of the switching cams, the base plate 3 is provided with three mounting holes 37, which are each respectively surrounded and reinforced by a ring-shaped collar 38. Appropriately configured bolt or pin-shaped holding elements protrude from the floor 23 of the housing 2 through these mounting holes 37 respectively, so as to provide a form-locking connection between the base support plate 3 and the housing 2 preventing relative rotation in a plane perpendicular to the axis 30 of the switching shaft 4.

In order to allow convenient and easy mounting of various types and configurations of mechanical and/or inductive switches, the base support plate 3 is provided with a plurality of different snap hooks 39 and support elements 40 appropriately configured to receive the various switches, as shown in FIGS. 11 to 13. Depending on the particular intended application of a respective signal transmitter 1, generally only some or a subset of the snap hooks 39 and support elements 40 will be used for receiving respective switches. It is advantageous to configure the base support plate 3 in a universal or standardized manner as just described so that a single configuration of the base support plate 3 can be used for all possible applications, whereby the inventory requirement is reduced, and advantages are achieved especially in view of the relatively large number of different arrangements applying to different applications and the relatively large total number of pieces needed.

In FIG. 11 it is further shown that the base support plate 3 has a generally circular outer contour, however, with a generally trapezoidal cut-out or notched area 41. The base support plate 3 is installed in the housing 2 in such an orientation that the notched area 41 coincides with a downwardly protruding or bulging region 47 of the floor 23 of the housing 2. A side wall 42 of the protruding floor portion 47 has a pass-through hole 43 for passing through an electrical connector cable that includes a plurality of individual electrical conductors that are connected to the individual switches. These electrical conductors are pre-wired to the switches and then simply passed down through the cut-out or notched area 31 when the switches are mounted on the base support plate 3, and then the multi-conductor cable is passed out through the hole 43 as the pre-assembled base plate is installed into the housing 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An apparatus for providing a signal indicating a position of a servo drive, said apparatus comprising:
    a housing;
    a switching shaft rotatably supported in said housing so as to be rotatable about a central rotation axis;
    at least one switch arranged in said housing; and
    at least one switching member mounted on said switching shaft and adapted to actuate said switch dependent on a rotational position of said switching member;
    wherein said switching shaft includes at least one elastically movable section that is elastically movable toward and away from said central rotational axis, and that has an external gearing provided thereon over a portion of a circumference of said shaft; and
    wherein said switching member has an opening into which said shaft extends, and an inner wall of said opening has provided thereon an internal gearing that is selectively engaged with said external gearing, so that said switching member can be selectively positioned at any selected one of a plurality of angular positions relative to said switching shaft and then held in said selected angular position by said internal gearing selectively engaged with said external gearing.

2. The apparatus according to claim 1, further comprising mounting feet adjustably connected to said housing and adapted to be mounted on the servo drive, and wherein said switching shaft has a shaft end protruding out of said housing and being adapted to be coupled in a positive rotational manner to an operating shaft of the servo drive.

3. The apparatus according to claim 1, wherein said switch is an inductive switch, and said switching member is an inductively detectable switching element arranged without contacting said switch.

4. The apparatus according to claim 1, wherein said switch is a mechanical switch, and said switching member is a switching cam arranged to selectively contact and thereby mechanically actuate said switch.

5. The apparatus according to claim 1, wherein said switch is selected from mechanical switches and inductive switches, and said switching member comprises a switching cam with an inductively detectable element embedded therein, such that said switching member is enabled to actuate both mechanical switches and inductive switches.

6. The apparatus according to claim 1, wherein a remainder of an outer cylindrical surface of said switching shaft in a respective plane on which lies said at least one elastically movable section is devoid of gearing.

7. The apparatus according to claim 1, wherein said internal gearing, said external gearing, and said elastically movable section are respectively so configured and so dimensioned such that said internal gearing and said external gearing remain intermeshed and no relative rotation occurs between said shaft and said switching member whenever a first torque not exceeding a torque threshold is applied relatively between said shaft and said switching member, and such that said internal gearing applies a deflecting force onto said external gearing and thereby elastically deflects said elastically movable section toward said central rotational axis to such an extent that said external gearing disengages from and rotationally slips relative to said internal gearing whereby relative rotation occurs between said switching member and said shaft whenever a second torque exceeding said torque threshold is applied relatively between said shaft and said switching member.

8. The apparatus according to claim 7, wherein said torque threshold is greater than a torque required for actuating said switch with said switching member and less than a torque that can be applied to said switching member with a manual tool.

9. The apparatus according to claim 1, wherein said shaft is a hollow shaft comprising a shaft wall, and said elastically movable section comprises an elastically deflectable integral part of said shaft wall that is connected by a junction web to a remaining portion of said shaft wall.

10. The apparatus according to claim 9, wherein said elastically movable section has a tongue shape with one fixed edge connected to said remaining portion of said shaft wall by said junction web and three free edges separated from said remaining portion of said shaft wall by a U-shaped gap opening through said shaft wall.

11. The apparatus according to claim 10, wherein said one fixed edge extends in a circumferential direction and said tongue shape extends from said fixed edge in a direction parallel to said central rotation axis.

12. The apparatus according to claim 1, wherein said switching shaft has therein at least one passage that extends parallel to said central rotational axis from a first end of said shaft to a plane perpendicular to said central rotational axis and intersecting said internal gearing of said switching member and that opens radially outwardly through an outer surface of said shaft at least at a location lying on said plane.

13. The apparatus according to claim 12, wherein said passage is a groove that opens through said outer surface of said shaft along an entire length of said groove from said first end of said shaft to said plane.

14. The apparatus according to claim 13, wherein said groove has a partial-oval cross-sectional shape.

15. The apparatus according to claim 13, comprising at least first and second ones of said switching member arranged next to one another respectively on first and second axially spaced ones of said plane, and comprising at least first and second ones of said groove, wherein said first groove extends from said first end of said shaft to said first plane and said second groove extends from said first end of said shaft to said second plane.

16. The apparatus according to claim 15, comprising two diametrically opposed ones of said elastically movable sections respectively arranged at each of said first and second planes, and wherein said first and second grooves are diametrically opposed from each other about said central rotational axis and respectively circumferentially offset from said diametrically opposed elastically movable sections.

17. The apparatus according to claim 1, wherein said elastically movable section with said external gearing provided thereon extends over a circumferential angular span in a range from 30° to 50°.

18. The apparatus according to claim 1, comprising at least two of said switching members mounted axially next to one another on said shaft and secured against axial sliding on said shaft.

19. A method of adjusting the apparatus according to claim 12, comprising the following steps:
   a) inserting an externally geared end portion of an adjusting tool into said passage from said first end of said shaft;
   b) advancing said tool into said passage until said externally geared end portion engages said internal gearing of said switching member where said passage opens on said plane;
   c) rotating said tool to apply a sufficient torque to said switching member relative to said shaft via said externally geared end portion engaging said internal gearing so that said elastically movable section deflects elastically toward said central rotational axis while allowing said internal gearing to rotationally slip relative to said external gearing and while said switching member remains at the same axial location of said shaft;
   d) discontinuing said rotating of said tool when a selected rotational position of said switching member relative to said shaft has been attained; and
   e) removing said tool from said passage.

20. An apparatus for providing a signal indicating a position of a servo drive, said apparatus comprising:
   a housing;
   a switching shaft rotatably supported in said housing so as to be rotatable about a central rotation axis;
   at least one switch arranged in said housing;
   at least one switching member mounted on said switching shaft and adapted to actuate said switch dependent on a rotational position of said switching member; and
   a base support plate on which said switches are removably mounted, wherein said plate is removably secured in said housing in a form-locking manner with said plate extending along a plane perpendicular to said central rotational axis, and wherein said plate is adapted to be removable from said housing in a direction along said axis with said switches mounted on said plate.

21. The apparatus according to claim 20, further comprising snap hooks that removably secure said switches onto said plate.

22. The apparatus according to claim 21, wherein said snap hooks are integrally provided on said plate, and said snap hooks are variously configured and dimensioned to be adapted to respectively receive a variety of different ones of said switches.

23. The apparatus according to claim 20, wherein said housing is substantially cylindrical and said plate has a predominantly circular contour.

24. The apparatus according to claim 20, further comprising holder members connected to said housing, and wherein said plate has openings therein, into which said holder members engage so as to secure said plate when said plate is arranged in said housing.

25. The apparatus according to claim 21, wherein said switching shaft comprises a hollow shaft comprising a shaft wall and an elastically radially deflectable tongue that is integrally connected to said shaft wall and that has an external gearing provided on an outer surface thereof;
   wherein said switching member comprises a cam member having a hole therethrough, with an internal gearing provided on an inner circumferential surface of said hole; and
   wherein said cam member is mounted on said hollow shaft with said shaft passing through said hole of said cam member, and with said internal gearing meshing with said external gearing.

* * * * *

UNITED STATES PATENT AND TRADEMARK OFFICE
CERTIFICATE OF CORRECTION

PATENT NO. : 6,185,828 B1  
DATED : February 13, 2001  
INVENTOR(S) : Schmidt

Page 1 of 1

It is certified that error appears in the above-identified patent and that said Letters Patent is hereby corrected as shown below:

Column 1,
Line 56, after "while", insert -- an --;

Column 10,
Line 13, after "outside", insert -- through --;

Column 16,
Line 31, after "claim", replace "21" by -- 20 --.

Signed and Sealed this

Fourteenth Day of August, 2001

*Attest:*

NICHOLAS P. GODICI  
*Attesting Officer*    *Acting Director of the United States Patent and Trademark Office*